(12) United States Patent
Xiao

(10) Patent No.: US 12,416,384 B2
(45) Date of Patent: *Sep. 16, 2025

(54) WALL MOUNT FOR DISPLAY DEVICE AND INSTALLATION METHOD

(71) Applicant: Jolly Innovation Technology Co., Ltd., Guangzhou (CN)

(72) Inventor: Li Xiao, Guangzhou (CN)

(73) Assignee: Jolly Innovation Technology Co., Ltd., Guangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/950,366

(22) Filed: Nov. 18, 2024

(65) Prior Publication Data

US 2025/0075849 A1 Mar. 6, 2025

Related U.S. Application Data

(63) Continuation-in-part of application No. 18/424,665, filed on Jan. 26, 2024, now Pat. No. 12,146,605.

(30) Foreign Application Priority Data

May 11, 2023 (CN) .......................... 202321142004.4

(51) Int. Cl.
  *F16M 13/02* (2006.01)
  *F16M 11/08* (2006.01)
  *F16M 11/20* (2006.01)

(52) U.S. Cl.
  CPC ............ *F16M 13/02* (2013.01); *F16M 11/08* (2013.01); *F16M 11/2014* (2013.01); *F16M 11/2092* (2013.01)

(58) Field of Classification Search
  CPC . A47F 5/08; A47F 5/0807; A47F 5/10; A47G 1/08; A47G 1/16; A47G 1/1613;
  (Continued)

(56) References Cited

U.S. PATENT DOCUMENTS

D507,477 S 7/2005 Pfister
D543,210 S 5/2007 Stenhouse et al.
(Continued)

FOREIGN PATENT DOCUMENTS

CN 306321782 S 2/2021
CN 306391588 S 3/2021
(Continued)

OTHER PUBLICATIONS

Mount-It! Recessed TV Wall Mount, Articulating Full Motion in-Wall TV Bracket for Flush Installation, posted Dec. 2, 2018 [online], [retrieved Oct. 20, 2023]. Retrieved from internet, https://www.amazon.com/dp/B07K7T9JH2 (Year: 2019).

(Continued)

*Primary Examiner* — Alfred J Wujciak
(74) *Attorney, Agent, or Firm* — ScienBiziP, P.C.

(57) ABSTRACT

The present invention provides a wall mount, comprising: a metal piece directly fixedly mounted to a wall, the wall including two plane surfaces opposite each other, and a side surface coupled to the two plane surfaces, the two plane surfaces and the side surface forming a free end of the wall; an adjustable back plate configured to fix the display device; and a rotatable supporting member movably connected to the metal piece and the adjustable back plate, wherein the rotatable supporting member comprises a rear arm, a middle arm and a front arm; the rear arm, the middle arm and the front arm are sequentially arranged between the metal piece and the adjustable back plate.

11 Claims, 8 Drawing Sheets

(58) Field of Classification Search
CPC ........ A47G 1/164; A47G 1/166; F16M 11/06; F16M 11/08; F16M 11/10; F16M 2200/063; F16M 2200/065; F16M 13/02
USPC .............. 248/919, 920, 921, 922, 923, 121, 248/123.11, 123.2
See application file for complete search history.

(56) References Cited

U.S. PATENT DOCUMENTS

| | | |
|---|---|---|
| D632,287 S | 2/2011 | Molter et al. |
| D633,484 S | 3/2011 | Molter et al. |
| D640,672 S | 6/2011 | Molter et al. |
| D656,493 S | 3/2012 | Dolack |
| D668,256 S | 10/2012 | Matteo |
| D816,646 S | 5/2018 | Pei |
| D842,284 S | 3/2019 | Pei |
| D878,382 S | 3/2020 | Pei |
| D925,509 S | 7/2021 | Jin |
| D935,869 S | 11/2021 | Chen |
| D936,045 S | 11/2021 | Xie |
| D948,523 S | 4/2022 | Xie |
| D964,375 S | 9/2022 | Xie |
| D966,278 S | 10/2022 | Lu |
| D971,901 S | 12/2022 | Xie |
| D1,003,904 S | 11/2023 | You et al. |
| D1,005,301 S | 11/2023 | Wang et al. |
| D1,006,033 S | 11/2023 | Pan |
| D1,008,013 S | 12/2023 | Kolz et al. |
| 12,146,605 B1 * | 11/2024 | Xiao ...................... F16M 13/02 |
| 2004/0159757 A1 | 8/2004 | Pfister |
| 2008/0035816 A1 | 2/2008 | Ciungan |
| 2008/0258029 A1 | 10/2008 | Zhang |
| 2011/0108688 A1 | 5/2011 | Parruck |
| 2018/0177299 A1 | 6/2018 | Pei |
| 2019/0191879 A1 | 6/2019 | Pei |

FOREIGN PATENT DOCUMENTS

| | | |
|---|---|---|
| CN | 306579865 S | 6/2021 |
| EM | 008272678-0015 S | 11/2020 |

OTHER PUBLICATIONS

Everything You Need In-Wall TV Mounts Kanto R300 & R500, posted Oct. 12, 2021 [online], [retrieved Oct. 20, 2023]. Retrieved from internet, https://www.youtube.com/watch?v=j448LBrQLHo (Year: 2021).

VIVO Recessed 50 to 75 inch LED LCD TV Wall Mount, posted Jan. 25, 2023 [online], [retrieved Oct. 20, 2023]. Retrieved from internet,https://www.amazon.com/dp/B0BT3GG4BJ (Year: 2023).

Monoprice Specialty Full Motion TV Wall Mount Bracket Recessed, posted May 10, 2013 [date sourced from oldest review, oldest review clearly referencing the design shown is May 27, 2013], [retrieved Jan. 16, 2024]. Retrieved from internet, https://www.monoprice.com/product?p_id=10223 (Year: 2013).

* cited by examiner

WALL MOUNT FOR DISPLAY DEVICE AND INSTALLATION METHOD

RELATED APPLICATIONS

This application is a continuation-in-part (CIP) of U.S. patent application Ser. No. 18/424,665, filed on Jan. 26, 2024, entitled "WALL MOUNT FOR DISPLAY DEVICE", invented by Li Xiao.

TECHNICAL FIELD

The present disclosure relates to the technical field of racks, specifically relates to a wall mount for a display device.

BACKGROUND

As people's living standard has improved, the functions of display device, such as television sets and display panels on the market are becoming more and more diversified. The television set can not only be used as a household to watch television programs, but also can be used for commercial purposes such as live broadcast and learning. Therefore, due to the demand for multi-angle functions of the television, a wall mount configured for display device capable of multi-angle adjustment of the television emerges.

In the case of limited space, how to adjust a television to an appropriate position by using a television supporting rack is of great significance. Therefore, there is a need for a wall mount for display device that solves the described problem.

DETAILED DESCRIPTION

It is important to note that the embodiments of the present disclosure and the features in the embodiments can be combined under the condition of no conflicts. Preferred embodiments of the present disclosure are described in detail with reference to the drawings as follow.

Figure 1:
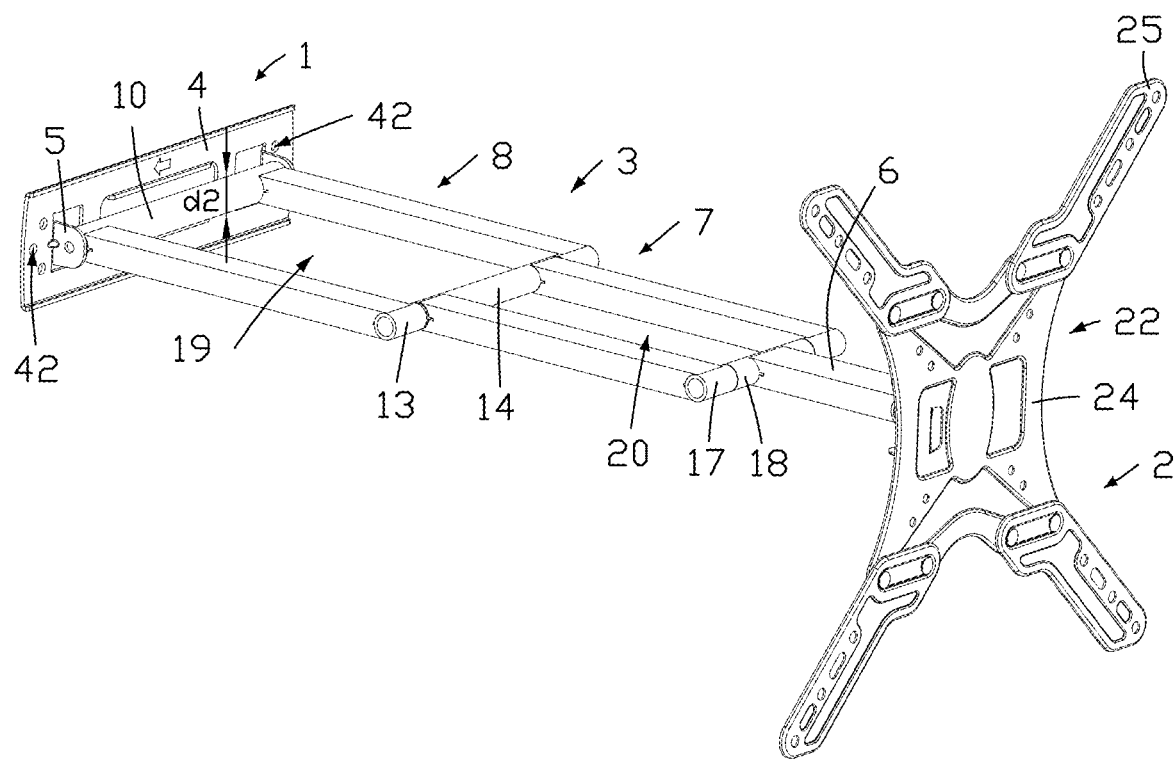
FIG. 1 is a structural schematic diagram of a wall mount according to the present embodiment.
Figure 2:
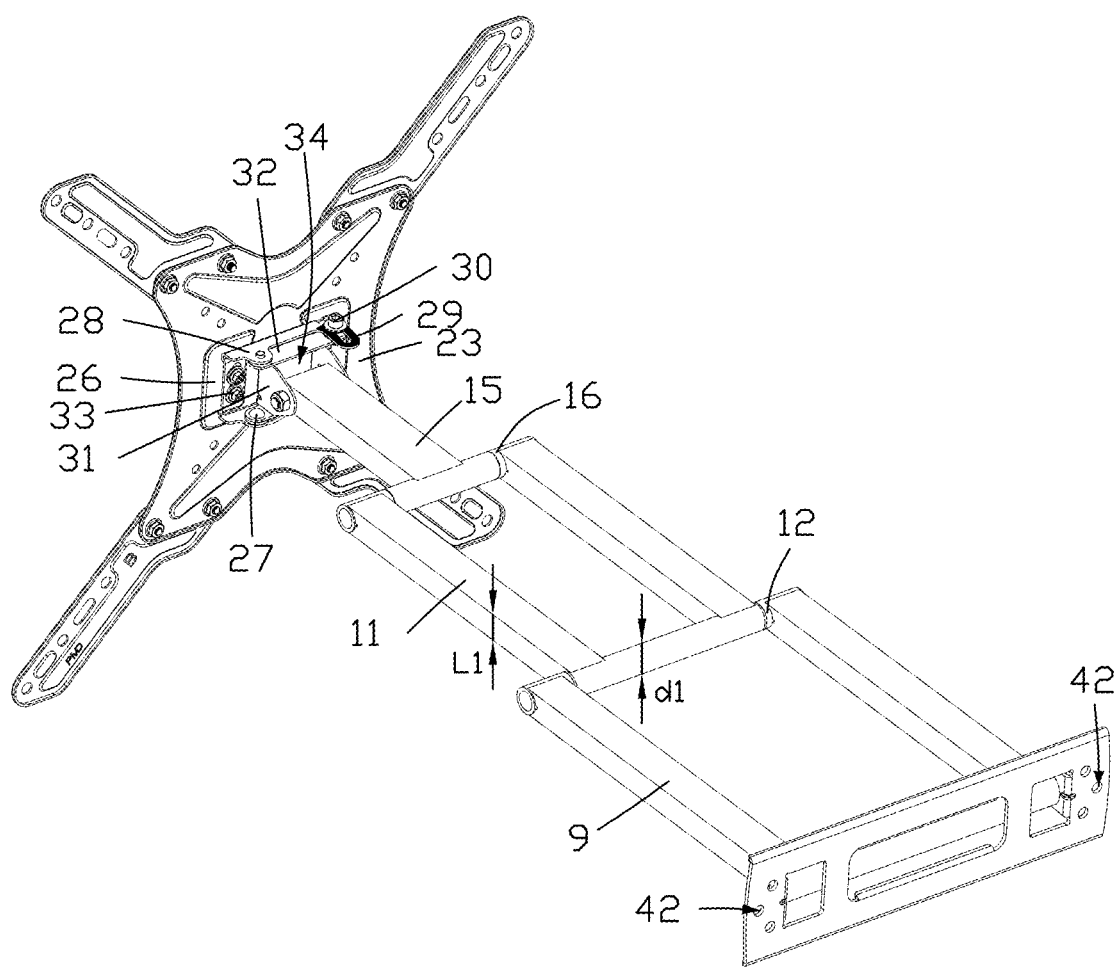
FIG. 2 is a structural schematic diagram of a wall mount according to the present embodiment.
Figure 3:
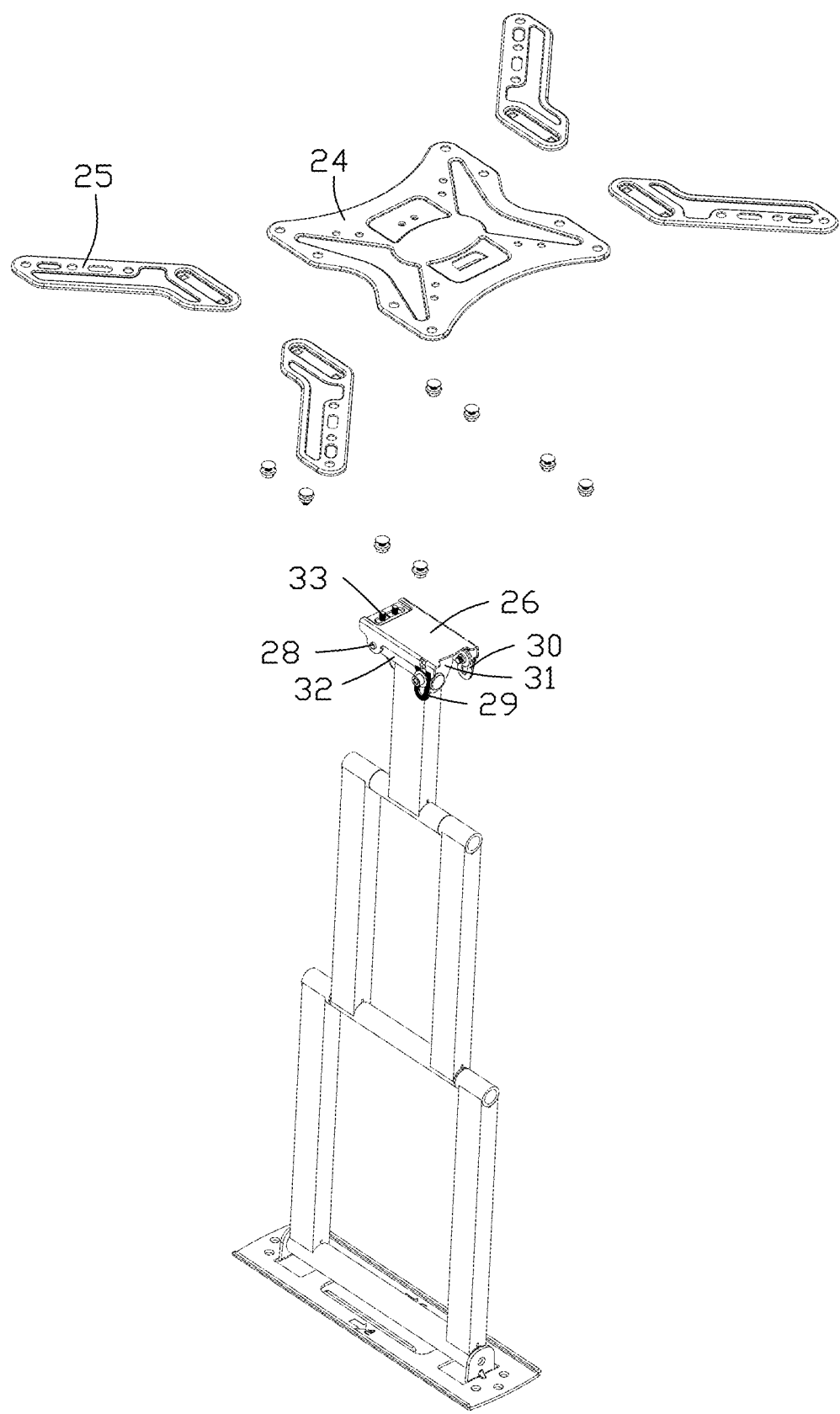
FIG. 3 is a partial exploded view of FIG. 1.

As shown in FIGS. 1-3, the wall mount 100 of the present embodiment is configured for hanging a display device, e.g. a television, on the wall 200 (showed in FIG. 4 to FIG. 8). As shown in FIG. 1, the wall mount 100 includes a wall fixing member 1 fixedly mounted on the wall 200, an adjustable back plate 2 for fixing the television, and a rotatable supporting member 3 for connecting the wall fixing member 1 and the adjustable back plate 2.

The wall fixing member 1 is made from a metal piece, which includes a body 4 and a connecting portion including two connecting protrusions 5. The body 4 can be for example a rectangular metal piece and directly fixedly mounted to a surface of the wall 200. That is, the wall fixing member 1 is capable of directly fixing on the surface of the wall 200, and therefore there is no need to dig a hole in the wall to accommodate the wall fixing member 1. In some embodiments, the wall fixing member 1 may also be a surface mount directly mounted to an attachment surface in a non-in-wall mounted manner. The two connecting protrusions 5 are respectively located at one side of the body 4 away from the wall 200, and the two connecting protrusions 5 respectively protrude from two ends of the body 4. Compared with a fixing member that require installing two wooden columns in the wall 200, the structure of the wall fixing member 1 of the present enclosure has a certain stability, and only one wooden column needs to be installed in the wall 200, thereby improving the convenience of installation while saving materials. Two engaging structures are also respectively provided on two opposite sides of the wall fixing member 1 and are configured to fix the wall fixing member 1 to the wall. In the embodiment, the engaging structure can be for example a set of screw holes 42. In this embodiment, although the diagrams show that the connecting portion including two connecting protrusions 5, but in other embodiment, the connecting portion may be other structure, which is not limit here.

The rotatable supporting member 3 is a foldable multi-segment structure, for example, including a front arm 6, a middle arm 7 and a rear arm 8 which are sequentially arranged between the wall fixing member 1 and the adjustable back plate 2.

The following will provide a detailed explanation of the structure of the front arm 6, the middle arm 7 and the rear arm 8.

The rear arm 8 includes two first rotation arms 9 arranged in parallel and a first pivot member 10. Two ends of the first pivot member 10 are rotationally connected to the two connecting protrusions 5, so that the rotatable supporting member 3 is rotationally connected to the wall fixing member 1. The two first rotation arms 9 are respectively fixedly connected to two ends of the first pivot member 10, so that the two first rotation arms 9 rotate together with the first pivot member 10, and thus the rear arm 8 is rotationally connected to the wall fixing member 1. A first storage space 19 is formed between the two first rotation arms 9 for storing the middle arms 7. In the embodiment, the first storage space 19 is shaped as a rectangular shape having its short sides parallel to the first pivot member 10. Due to the long sides of the first storage space 19 is parallel the ground, the rotatable supporting member 3 can reach longer arm lengths in an unfolded status. Moreover, due to the short sides of the first storage space 19 coupled to the first pivot member 10, cooperating with smaller-sized wall fixing member 3, the wall mount adapts to hanging on multiple different sizes of the wall. For example, the wall mount can be more easily hung in the wall corners, which has a limited space.

The middle arm 7 includes two second rotation arms 11 arranged in parallel and a second pivot member 12. The second pivot member 12 is connected to the rear arm 8, and the second pivot member 12 includes a first rotation portion 13 and a second rotation portion 14 that are rotationally disposed with each other. The two first rotation arms 9 are fixedly connected to two ends of the first rotation portion 13, and the second rotation portion 14 is rotationally connected to the two second rotation arms 11, so that the middle arm 7 is rotationally connected to the rear arm 8, further, the two second rotation arms 11 are fixedly connected to the second rotation portion 14, thereby the two second rotation arms 11 rotate together with the second rotation portion 14, and then the rear arm 8 is rotationally connected to the middle arm 7 and the middle arm 7 is rotatable to be accommodated in the first storage space 19, so that the middle arm 7 is folded and accommodated relative to the rear arm 8. A second storage space 20 for accommodating the front arm 6 is formed between the two second rotation arms 11. In the embodiment, the second storage space 20 is also shaped as a rectangular having its short sides parallel to the second pivot member 10, and is also accommodated into the first storage space 19.

The front arm 6 includes a third rotation arm 15 and a third pivot member 16. The third pivot member 16 is connected to the middle arm 7, and the third pivot member 16 includes a third rotation portion 17 and a fourth rotation portion 18 rotationally arranged with each other. Two ends of the third rotation portion 17 are fixedly connected to the two second rotation arms 11. The fourth rotation portion 18 is fixedly connected to one third rotation arm 15, so that one third rotation arm 15 is rotationally connected to the fourth rotation portion 18, and further can be rotatable to be accommodated in the second storage space 20, so that the front arm 6 can be folded and accommodated relative to the middle arm 7. In addition, a diameter d1 of the second pivot member 12 is greater than a thickness L1 of the third pivot member 16, and a diameter d2 of the first pivot member 10 is greater than the diameter d1 of the second pivot member 12, that is, the closer to the wall fixing member 1, the thicker the pivot member. The wall mount 100 is a lever taking the wall fixing member 1 as a fulcrum, and the closer the pivot member is to the wall fixing member 1, the larger the force applied to the pivot member is. Therefore, by the setting of the pivot member closer to the wall fixing member 1 to be thicker, it can be ensured that the strength of each pivot member is sufficient, so that the wall mount 100 is not easy to deform. Meanwhile, the farther away from the wall fixing member 1 the pivot member is, the longer the arm of force is, and the farther away from the wall fixing member 1 the thinner the pivot member is, the smaller the dead weight of the pivot member is, which can reduce the value of the moment generated by the wall fixing member, and is beneficial to reduce the overall weight of the wall mount 100.

Specifically, both the middle arm 7 and the rear arm 8 are configured as two rotation arms arranged in parallel, and the front arm 6, the middle arm 7 and the rear arm 8 are formed a telescope structure, the middle arm 7 can be accommodated in the first storage space 19 in a stacked manner, and the front arm 6 may be accommodated in the second storage space 20 in a stacked manner, The stability of the whole structure is increased, the reliability of the structure is improved, and the middle arm 7, the rear arm 8 and the front arm 6 of the wall mount 10 are folded, thus, different angles can be adjusted.

One end of the third rotation arm 15 away from the third pivot member 16 is rotationally connected with the adjustment back plate 21. The adjustment back plate 21 includes a back plate 22 fixed to the television and an adjustment assembly (not shown) connected to the back plate 22. The adjustment assembly (not shown) includes a fixing seat 26 and an adjustment member 27. The adjustment member 27 is rotationally connected to the third rotation arm 15 of the front arm 6. The adjustment member 27 includes two first connecting parts 31, two second connecting parts 32 and a bottom (not shown). The bottom (not shown) has a plate shape, the two first connection portions 31 protrude from two opposite sides of the bottom (not shown), and a receiving groove 34 is formed between the two first connection parts 31. One end of the third rotation arm 15 is received in the receiving groove 34, and is fixedly connected to one end of the third rotation arm 15 by two screws (not shown), so that the third rotation arm 15 can rotate around an axis relative to the first connecting part 32. The two first connecting parts 31 are arranged to protrude towards the direction away from the back plate 22 and perpendicular to the fixing seat 26, the two second connecting parts 32 are arranged to protrude perpendicular to the fixing seat 26, and the first connecting parts 31 and the second connecting parts 32 form an accommodating groove 34 on the fixing seat. The two second connecting parts 32 extend and protrude along the other two opposite sides of the bottom (not shown), and are arranged perpendicular to the two first connecting parts 31, so that the bottom (not shown), a portion of the two second connecting parts 32 and the two first connecting parts 31 form one receiving groove 34 together. The two second connecting parts 32 protrude outwards relative to the two first connecting parts 31 and are rotationally connected to the fixing seat 26.

The fixing seat 26 includes two pivoting protrusions 28 and two adjustment protrusions 29. The two adjustment protrusions 29 form an adjusting sliding groove 30. The adjustment member 27 is rotationally mounted to the fixing seat 26, and the rotatable supporting member 3 can rotate relative to the adjustment member 27 to adjust the angle of the television.

One end of the second connecting part 32 is rotationally connected to the pivoting protrusion 28, and another end of the second connecting part 32 is rotationally connected to the adjustment protrusion 29. Each adjusting protrusion 29 includes an adjusting sliding groove 30, and the angle of the television can be adjusted by sliding the adjusting protrusion 29 along the adjusting sliding groove 30 to a suitable position. The height of the pivotal protrusion 28 is consistent with the height of the second connecting part 32, and the height of the adjustment protrusion 29 is higher than that of the second connecting part 32, so that the adjustable range of angles is wider. In this implementation, the adjusting sliding slot 30 is a curved sliding slot, and shapes of the adjusting sliding slot 30 are designed differently according to actual situations.

The back plate 22 includes a mounting board 24 and four connecting plates 25. The fixing seat 26 is fixed to the mounting board 24 by two fixing members 33. The periphery of the mounting board 24 is of an arc-shaped design, and a total of eight small holes are provided along the diagonal direction of the mounting board 24 and configured for mounting the television. The four corners of the mounting board 24 are respectively provided with two fixing pieces (not shown), the four connecting plates 25 are respectively fixed to the mounting board 24 by the two fixing pieces, and each connecting plate is provided with three circular heat dissipation holes (not shown), one elliptical heat dissipation hole (not shown), and two load-bearing protrusions (not shown). By means of the stability of the structure, the weight to which the mounting board can withstand is increased.

The assembling process of the wall mount 100 is described with reference to FIGS. 1-3. The wall fixing member 1 is fixed to the wall via a wooden column; the rear arm 8 is rotationally connected to the wall fixing member 1 via the first pivot member 10; the middle arm 7 is rotationally connected to the rear arm 8 via the second pivot member 12; the front arm 6 is rotationally connected to the middle arm 7 via the third pivot member 16; the adjustment back plate 21 is rotationally connected to the front arm 6 via an adjustment assembly (not shown); and the television is fixed on the adjustment back plate 21.

The foldable status of the wall mount 100 can be regulated among a first state (shown in the FIG. 4 and FIG. 5), a second state (shown in the FIG. 6 and FIG. 8) and a third state (shown in the FIG. 7), when viewed from one side of the wall mount 100.

Figure 4:
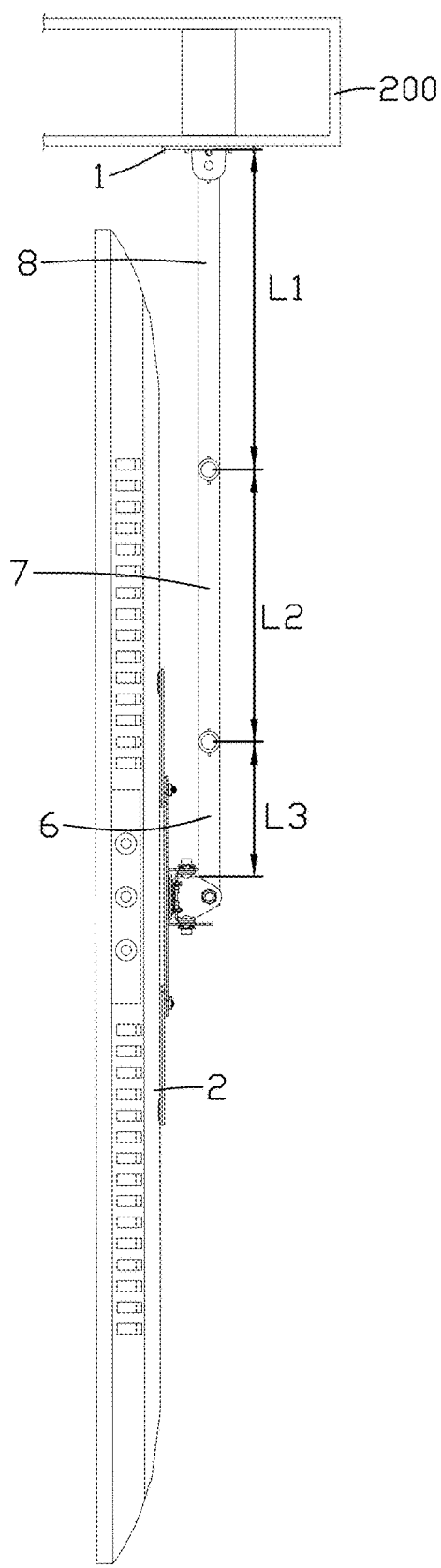
FIG. 4 is a diagram of a usage scenario of the wall mount according to the present embodiment.
Figure 5:
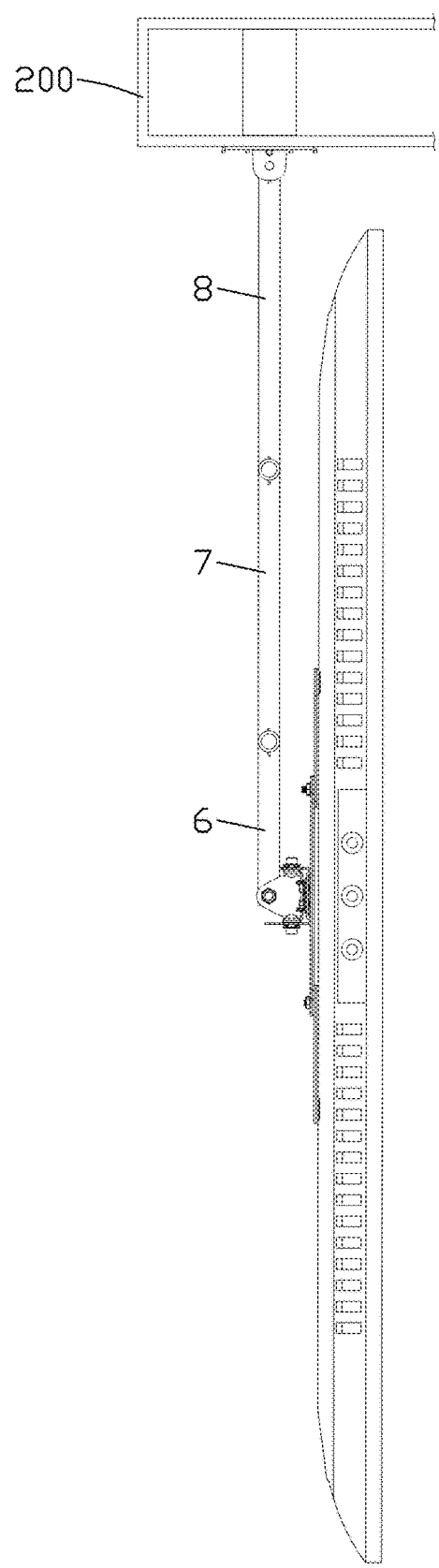
FIG. 5 is a diagram of a usage scenario of the wall mount according to the present embodiment.

Referring to FIG. 4 and FIG. 5, in the first state, each arms of the rotatable supporting member 3 are fully expanded so that the front arm 6, the middle arm 7 and the rear arm 8 are substantially aligned in a straight line.

As shown in FIG. 4, when the front arm 6, the middle arm 7 and the rear arm 8 rotate to the same straight direction, and the adjustment assembly (not shown) rotates to be perpendicular to the rotation axis direction and towards the left side, the television is located on the left front side of the wall body, so that the television can be located at a position perpendicular to the wall 200, thereby realizing the front view of the television at different positions, and achieving a better use experience.

As shown in FIG. 5, when the front arm 6, the middle arm 7 and the rear arm 8 rotate to the same straight direction, and the adjustment assembly (not shown) rotates to be perpendicular to the rotation axis direction and towards the right side, the television is located at the front right side of the wall 200, so that the television can be located at a position perpendicular to the wall 200, thereby realizing the front view of the television at different positions, and achieving a better use experience.

Figure 6:
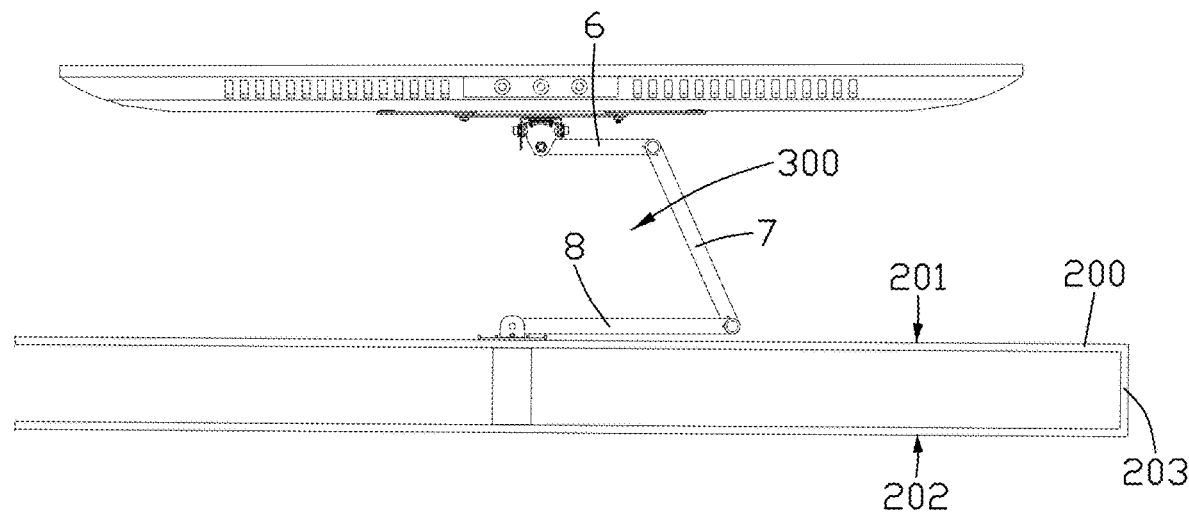
FIG. 6 is a diagram of a usage scenario of the wall mount according to the present embodiment.
Figure 8:
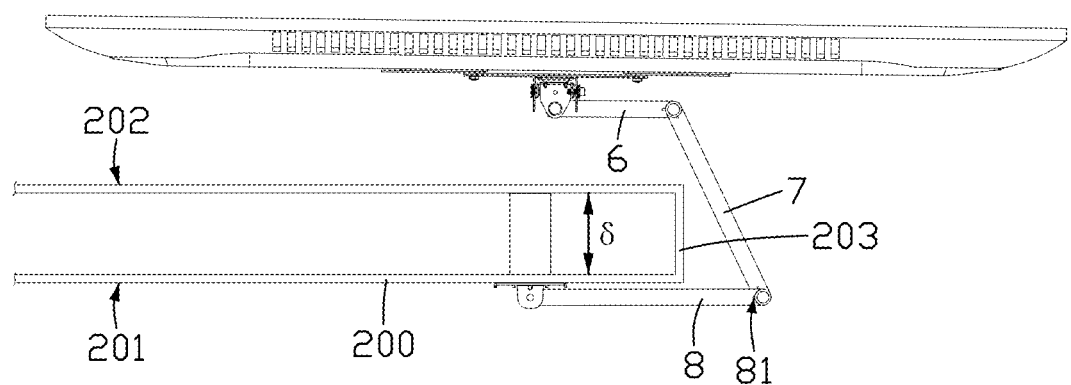
FIG. 8 is a diagram of a usage scenario of the wall mount according to the present embodiment.

Referring to FIG. 6 and FIG. 8, in the second state, the rotatable supporting member 3 is adapted to a wall 200*a* including a first surface 201, the second surface 202 opposite to the first surface 201, and a narrow side surface 203 connected to the first and second surfaces 201, 202. The first and second surfaces 201, 202 are plane surfaces. The rear arm 8 of the rotatable supporting member 3 is arranged mostly adjacent to the first surface 201 of the wall 200*a*, and the rear arm 8 is parallel to the front arm 6. An accommodation space 300 is defined by the rear arm 8, the middle arm 7 and the front arm 6. In one embodiment, referring to FIG. 8, the accommodation space 300 is configured to receive an end formed by the narrow side surface 203 and part of the first and second surfaces 201, 202. In some exemplary embodiments of the present disclosure, the rear arm 8 rotates relative to the pivot axis 10 and rotates to a position parallel to and/or closely attached to one of the first surface 201 and the second surface 202. A cross section of the accommodation space 300 is an approximate shape of a half frame.

As shown in FIG. 6, the present wall mount can be rotated to an appropriate angle at a front side of a wall according to needs, thereby saving space; and the television can be closer to a person, or the television can be further away from the person, thereby satisfying the requirements of viewing at different distances between the person and the television, so that the use experience is better.

As shown in FIG. 8, the television rack of the present invention can also rotate to the rear side of the wall for viewing, so that the television can also be viewed on the front side on the back side of the wall without carrying the television, thereby having a better use experience. As shown in FIG. 8, when the rear arm 8 is rotated in the horizontal direction, the middle arm 7 is bent in the rear side direction of the wall 200, and the front arm 6 is rotated in the horizontal direction, the front arm 6, the middle arm 7, and the rear arm 8 form a U-shape.

Figure 7:
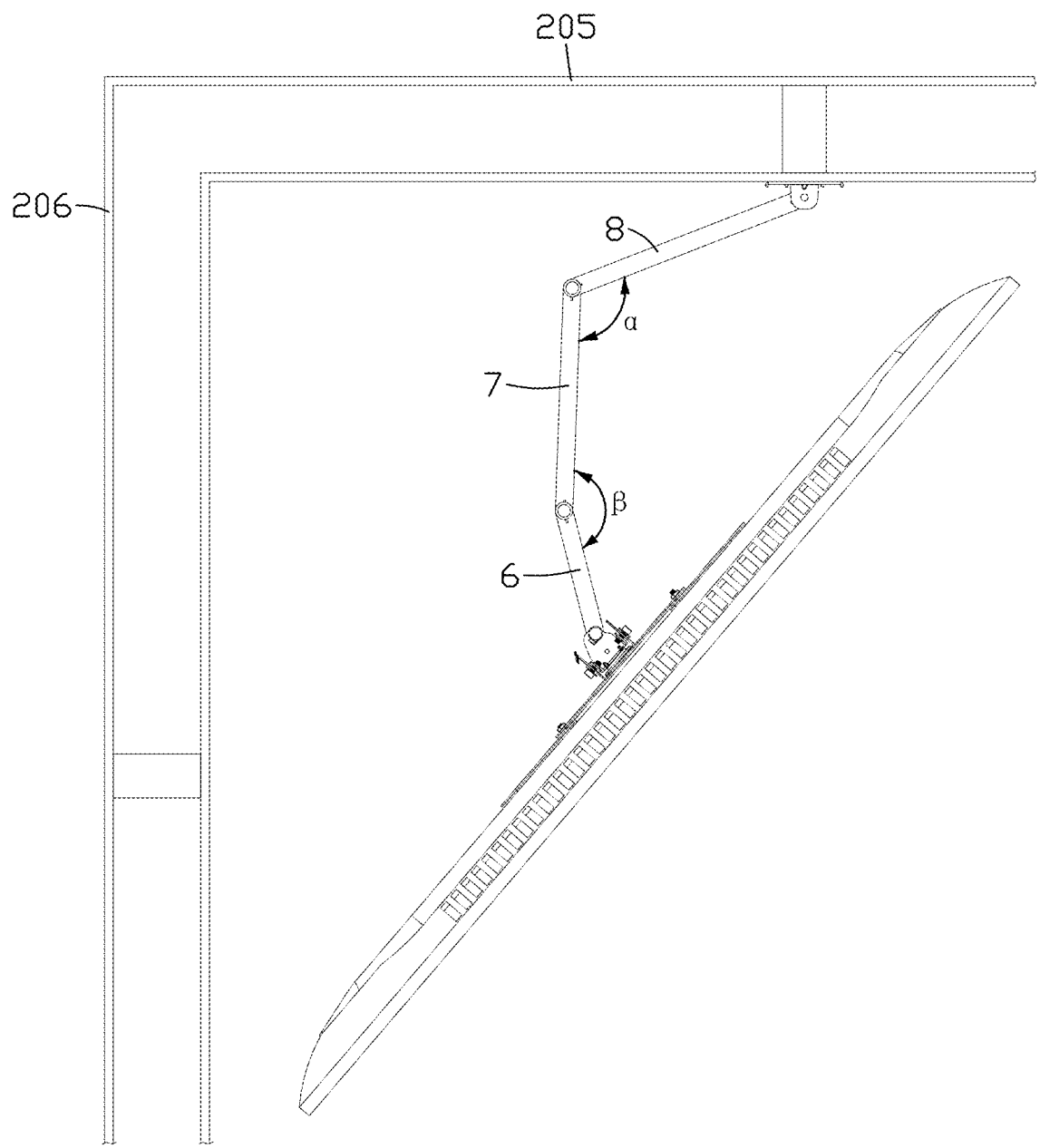
FIG. 7 is a diagram of a usage scenario of the wall mount according to the present embodiment.

Referring to FIG. 7, in the third state, the rotatable supporting member 3 is adapted to a corner formed by a first wall 205 and a second wall 206 intersected with the first wall 205. The wall fixing member 1 has a small size to more easily fixed to any one of the first wall 205 and a second wall 206, and the rear arm 8 rotates relative to the wall fixing member 1, the middle arm 7 rotates relative to the rear arm 8, and the front arm 6 rotates relative to the middle arm 7, the arrangement of the rear arm 8, the middle arm 7 and the front arm 6 can be adjusted more freely, so that the wall mount can be received in the corner defined by the first wall 205 and a second wall 206.

As shown FIG. 7, the present wall mount can be rotated to be located at a corner position, thereby saving space; and the television can be closer to a person, or the television can be further away from the person, thereby satisfying the requirements of viewing at different distances between the person and the television, so that the use experience is better.

When the wall mount 100 is not installed on the wall 200, 200*a*, a first preset angle $\angle\alpha$ defined by the rear arm 8 and the middle arm 7 is in a range of 0-360 degrees, a second preset angle $\angle\beta$ defined by the front arm 6 and the middle arm 7 is in a range of 0-360 degrees. Therefore, the first preset angle $\angle\alpha$ and the second preset angle $\angle\beta$ can be regulated so as to place the display device at a suitable position.

In one embodiment, in the third state, the first preset angle $\angle\alpha$ and the second preset angle $\angle\beta$ are obtuse angles.

In addition, a length of the middle arm 7 is greater than a thickness $\delta$ of the wall 200.

In addition, the present disclosure further provides an installation method of the wall mount described above.

The installation method comprises:

Attaching the wall fixing member 1 of the wall mount to a side of the wall 200.

Regulating the rear arm 8 of the rotatable supporting member 3 to be substantially adjacent to the side of the wall 200, and the other end of the rear arm 8 connected to the middle arm 7 protruding out of a free end of the wall 200.

Regulating each of the middle arm 7 and the front arm 6 of the rotatable supporting member 3, such that the adjustable back plate 1 is on another side of the wall 200 that is opposite to the side having the metal piece attached thereon (shown in FIG. 8).

It should be understood that the foregoing embodiments are merely intended to describe the technical solutions of the present disclosure, but not intended to limit the present disclosure. For persons skilled in the art, modifications may be made to the technical solutions described in the foregoing embodiments, or equivalent replacements may be made to some technical features in the technical solutions; All these modifications and replacements should belong to the scope of protection of the appended claims of the present disclosure.

What is claimed is:

1. A wall mount for mounting a display device, comprising:
    a metal piece directly fixedly mounted to a wall, the wall including two plane surfaces opposite each other, and a side surface coupled to the two plane surfaces, the two plane surfaces and the side surface forming a free end of the wall;
    an adjustable back plate configured to fix the display device; and
    a rotatable supporting member movably connected to the metal piece and the adjustable back plate,
    wherein the rotatable supporting member comprises a rear arm comprising two first rotation arms arranged parallel to each other, a middle arm comprising two second rotation arms arranged parallel to each other, and a front arm; the rear arm, the middle arm and the front arm are sequentially arranged between the metal piece and the adjustable back plate;

a first storage space is formed between the two first rotation arms, and one end of the rear arm is rotationally connected to the metal piece, a second storage space is formed between the two second rotation arms, and one end of the middle arm is rotationally connected to another end of the rear arm, so that the middle arm is rotatable to be accommodated in the first storage space in a stacked manner, one end of the front arm is rotationally connected to another end of the middle arm, so that the front arm is rotatable to be accommodated in the second storage space in a stacked manner, another end of the front arm is rotationally connected with the adjustable back plate; and a distance between the display device fixed on the adjustable back plate and the wall where the metal piece is fixed is adjusted by changing the stacked manners of the rear arm, the middle arm and the front arm;

the metal piece further comprises a body and a connecting portion extending from one side of the body away from the wall, the end of the rear arm is connected to the connecting portion via a first pivot member, the first pivot member is rotationally connected to the connecting portion; and the rotatable supporting member is configured to rotate into an accommodation space defined by the rear arm, the middle arm and the front arm, and in a use state, the accommodation space accommodates the free end of the wall by rotating the rear arm to be substantially adjacent to the wall and the other end of the rear arm that is connected to the middle arm protrudes out of the free end of the wall.

2. The wall mount according to claim 1, wherein each of the rear arm, the middle arm and the front arm of the rotatable supporting member is further capable of being fully expanded so that the front arm, the middle arm and the rear arm are substantially aligned in a straight line.

3. The wall mount according to claim 1, wherein the rear arm, the middle arm and the front arm of the rotatable supporting member are further capable of being regulated, so that a first preset angle defined by the rear arm and the middle arm and a second preset angle defined by the front arm and the middle arm are obtuse angles.

4. The wall mount according to claim 1, wherein the first storage space is shaped as a rectangular shape having its short sides parallel to the first pivot member.

5. The wall mount according to claim 1, wherein the middle arm further comprises a second pivot member, the second pivot member is rotationally connected to one end of each of the two first rotation arms away from the metal piece, the two second rotation arms are rotationally connected to the two first rotation arms, respectively, via the second pivot member.

6. The wall mount according to claim 5, wherein a thickness of the first pivot member is greater than a thickness of the second pivot member.

7. The wall mount according to claim 5, wherein the second pivot member includes a first rotation portion and a second rotation portion, the first rotation portion and a second rotation portion are rotationally disposed with each other, the first rotation portion is fixedly connected to one end of each of the two first rotation arms, and the second rotation portion is fixedly connected to one end of each of the two second rotation arms, the third pivot member comprises a third rotation arm and a fourth rotation portion, the third rotation arm and the fourth rotation portion are rotationally disposed with each other, the third rotation arm are fixedly connected to another end of each of the two second rotation arms, the fourth rotation portion is fixedly connected to one end of each of the third rotation arms.

8. The wall mount according to claim 5, wherein the front arm includes a third rotation arm and a third pivot member, the third pivot member is rotationally connected to one end of each of the two second rotation arms away from the rear arm, one end of the third rotation arm is rotationally connected to the third pivot member, another end of the third rotation arm is rotationally connected with the adjustable back plate.

9. The wall mount according to claim 8, wherein the thickness of the second pivot member is greater than a thickness of the third rotation arm.

10. An installation method of the wall mount according to claim 1, comprising:

attaching the metal piece of the wall mount to a side of a wall;

rotating the rear arm of the rotatable supporting member to be substantially adjacent to the side of the wall, and the other end of the rear arm connected to the middle arm protruding out of a free end of the wall; and rotating each of the middle arm and the front arm of the rotatable supporting member, such that the adjustable back plate is on another side of the wall that is opposite to the side having the wall fixing member attached thereon.

11. A wall mount configured for mounting a display device, comprising:

a metal piece directly fixedly mounted to a surface of a wall;

an adjustable back plate configured to fix the display device; and a rotatable supporting member movably connected to the metal piece and the adjustable back plate;

wherein the rotatable supporting member comprises a rear arm comprising two first rotation arms arranged parallel to each other, a middle arm comprising two second rotation arms arranged parallel to each other, and a front arm, the rear arm, the middle arm and the front arm are sequentially arranged between the metal piece and the adjustable back plate;

wherein a first storage space is formed between the two first rotation arms, and one end of the rear arm is rotationally connected to the metal piece, a second storage space is formed between the two second rotation arms, and one end of the middle arm is rotationally connected to another end of the rear arm, so that the middle arm is accommodated in the first storage space in a stacked manner, one end of the front arm is rotationally connected to another end of the middle arm, so that the front arm is accommodated in the second storage space in a stacked manner, another end of the front arm is rotationally connected with the adjustable back plate; and a distance between the display device and the wall is adjusted by changing the stacked manner of the arms, and wherein the metal piece further comprises a body and two connecting protrusions each extending from one side of the body away from the wall, the two first rotation arms are rotationally connected to the corresponding one of the two connecting protrusions.

* * * * *